United States Patent [19]

Ishikawa

[11] Patent Number: 5,423,684

[45] Date of Patent: Jun. 13, 1995

[54] APPARATUS AND METHOD FOR FORMING A SWITCHBOARD UNIT CIRCUIT

[75] Inventor: Masahiro Ishikawa, Marugame, Japan

[73] Assignee: Mitsubishi Denki Kabushiki Kaisha, Tokyo, Japan

[21] Appl. No.: 25,242

[22] Filed: Mar. 2, 1993

[51] Int. Cl.⁶ .............................................. G09B 19/00
[52] U.S. Cl. .................................. 434/224; 434/365; 361/761
[58] Field of Search ................ 434/224, 365; 361/631, 361/752, 760, 761, 785; 364/488, 489; 129/847; 370/63

[56] References Cited

U.S. PATENT DOCUMENTS

| | | | |
|---|---|---|---|
| 4,369,479 | 1/1983 | Rickard | 361/631 X |
| 4,539,445 | 9/1985 | Jabben | 361/761 X |
| 4,742,431 | 5/1988 | Igarashi | 361/761 X |
| 4,779,340 | 10/1988 | Kihm et al. | 29/847 |
| 4,821,034 | 4/1989 | Anderson et al. | 370/63 X |
| 5,068,631 | 11/1991 | Vince | 361/761 X |
| 5,151,842 | 9/1992 | DeBiasi et al. | 361/634 X |

FOREIGN PATENT DOCUMENTS 53-41756  4/1978  Japan.
62-154694  7/1987  Japan.

Primary Examiner—Joe H. Cheng
Attorney, Agent, or Firm—Burns, Doane, Swecker & Mathis

[57] ABSTRACT

A switchboard unit circuit having functional components, such as relays and switches is formed using a wiring board device including a board, a wiring, e.g., a printed wiring, on the board, and board connectors connected to the wiring and provided to permit selective connection of the functional components to selectively form any one of a plurality of designs of unit circuits. The functional components and the wiring board device are disposed in or on a unit housing, and the board connectors are selectively connected to the functional components to selectively form a desired one of said plurality of designs of unit circuits.

23 Claims, 20 Drawing Sheets

APPARATUS AND METHOD FOR FORMING A SWITCHBOARD UNIT CIRCUIT

BACKGROUND OF THE INVENTION

The present invention relates to a unit circuit accommodated in a switchboard of a control center or the like, and a wiring board device used for forming the unit circuit, and a method for forming the unit circuit.

FIG. 12 shows a conventional unit circuit accommodated in a switchboard of a control center or the like. It comprises a unit case or housing 1, in which a molded-cased circuit breaker 2, a current transformer 3, a zero-phase current transformer 4, an electromagnetic switch 5, an overcurrent relay 6, auxiliary relays 7 and 8, and a terminal block 9 are disposed. These functional components are connected to each other by control circuit wires 14 and to main circuit wires 13, as illustrated in FIG. 13. The layout of the components is determined taking account of the spaces for the work of wiring.

Because the conventional unit circuit is configured as described above, the wiring between the components and the terminals has to be made for each different design or type of circuit. As a result, the work of wiring is time-consuming. Moreover, considerable space is required for the work of wiring around each component or between the adjacent components. This places a limitation on size reduction of the unit circuit.

SUMMARY OF THE INVENTION

The invention has been made to overcome the above problems, and its object is to improve the efficiency of forming, remodeling and servicing a unit circuit, and to reduce the size of a unit circuit.

The invention provides a wiring board device including a board, a wiring, e.g., a printed wiring, on the board, and board connectors (connectors provided on the board) connected to the wiring and provided to permit selective connection of functional components to selectively form any one of a plurality of designs of unit circuits. For forming a unit circuit, the functional components and the wiring board device are disposed in or on a unit housing, and the board connectors are selectively connected to the functional components to selectively form a desired one of said plurality of designs of unit circuits.

The combination of the unit housing, the functional component and the wiring board device is called a unit circuit intermediate assembly which can be used for formation of any one of a plurality of designs or types of unit circuits.

The above-mentioned functional components may include one or more of a circuit breaker, an electromagnetic switch, an auxiliary relay, a push-button switch, a selection switch, and an indicator lamp.

A terminal block may be additionally provided for connection with additional functional components provided outside or remote from the unit housing. Such additional functional components may include push-buttons switch for control from a location remote from the unit housing, and limit switches for automatic control. The terminal block may be provided in the unit housing, and has a plurality of terminals which may be connected to the board connectors by use of wires and component connectors, and which may also be connected to the additional functional components. For distinction, the functional components disposed in or on the unit housing are sometimes called internal functional components, while the functional components disposed outside the unit housing are sometimes called external functional components.

The board connectors may be of a normally-open type, and short-circuiting connectors may be selectively connected to the board connectors which are to be short-circuited.

Alternatively, the board connectors may be of a normally-closed type, and opening connectors may be selectively connected to the board connectors which are to be opened.

One end of each wire for connection with a functional component may be connected to the functional component prior to the disposition or mounting of the functional component in the unit housing. This will further facilitate the work of wiring and eliminates the need for a space around the functional component for the work of wiring.

The other end of each wire for connection with the functional component may be provided with a component connector (connector connected to the wires which in turn is connected to the component) for connection with the board connector. The board connector and the component connector may be of such a type that by simply pushing or plugging the component connector into the board connector, the component connector and the board connectors are electrically connected with each other. This configuration will further facilitate the work of wiring.

With the above configuration, a common wiring board device or a common unit circuit intermediate assembly can be used for forming any of various designs of unit circuits, and the work of the wiring is easy. The invention exhibits a particular advantage where the functional components (relays, switches) that are connected are mostly identical but their connection within the unit circuit is different.

The invention also facilitates remodeling, replacement and repair of the circuit.

BRIEF DESCRIPTION OF THE DRAWINGS

FIG. 12 is a front view showing a conventional unit circuit accommodated in a switchboard of a control center or the like.

DETAILED DESCRIPTION OF THE PREFERRED EMBODIMENT

An embodiment of the invention will now be described with reference to FIG. 1 to FIG. 9E.

Figure 1:
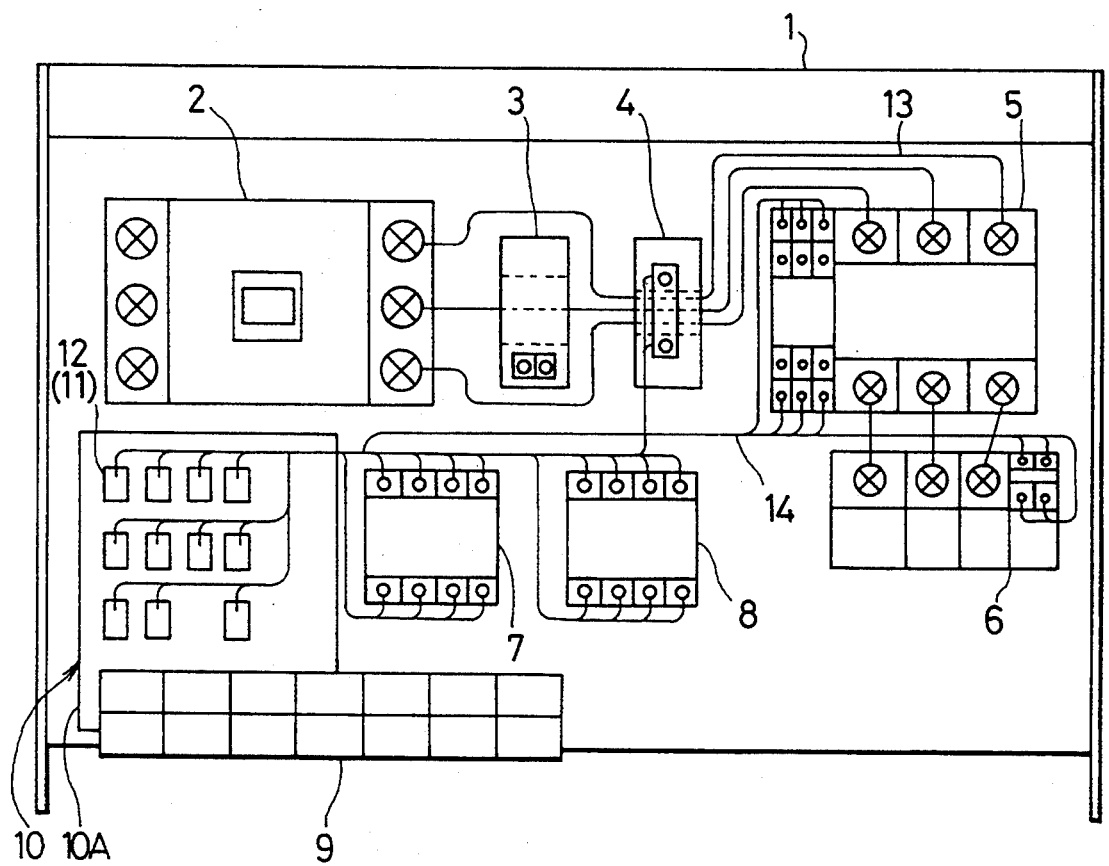
FIG. 1 is a front view showing a unit circuit formed using a wiring board device of an embodiment of the invention.

A unit circuit which is formed using a wiring board device of an embodiment is shown in FIG. 1. It comprises a molded-case circuit breaker 2, a current transformer 3, a zero-phase transformer 4, an electromagnetic switch 5, an overcurrent relay 6, auxiliary relays 7 and 8, a terminal block 9, and a wiring board assembly 10. These elements are accommodated in a unit case or housing 1 and are connected by main circuit wires 13 and control circuit wires 14 to form a unit circuit comprising a main circuit and a control circuit in the form of a sequential circuit.

The wiring board assembly 10 comprises a board 10A and printed wiring 15 formed on the board 10A and board connectors 11, some of which are connected with component connectors 12 or short-circuiting connectors 16. In the example shown, the board connectors 11 are arranged in an array, and the printed wiring is patterned to interconnect the board connectors.

Figure 2:
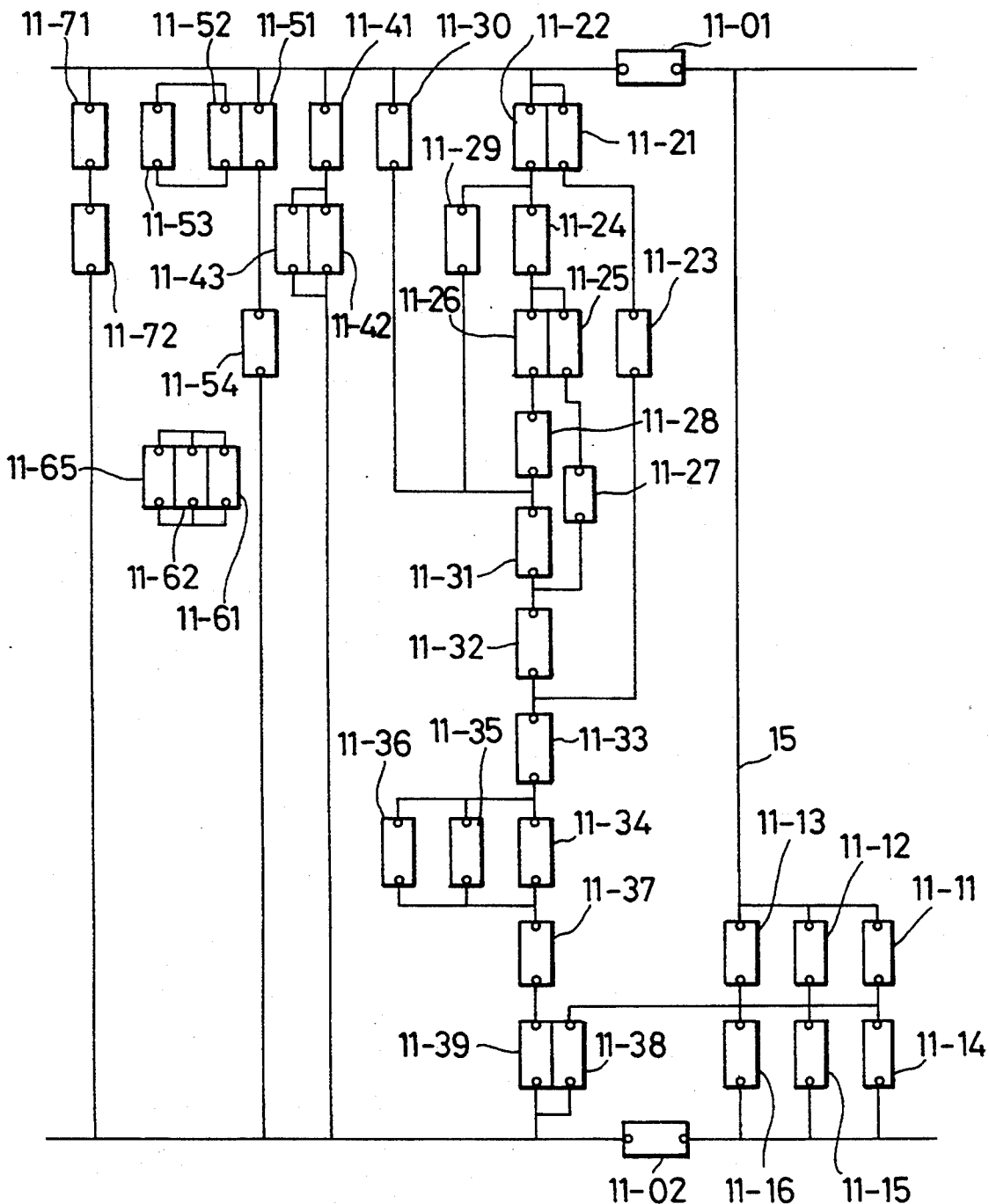
FIG. 2 is a front view of the wiring board device of the above embodiment, illustrating the printed wiring and board connectors.
Figure 3:
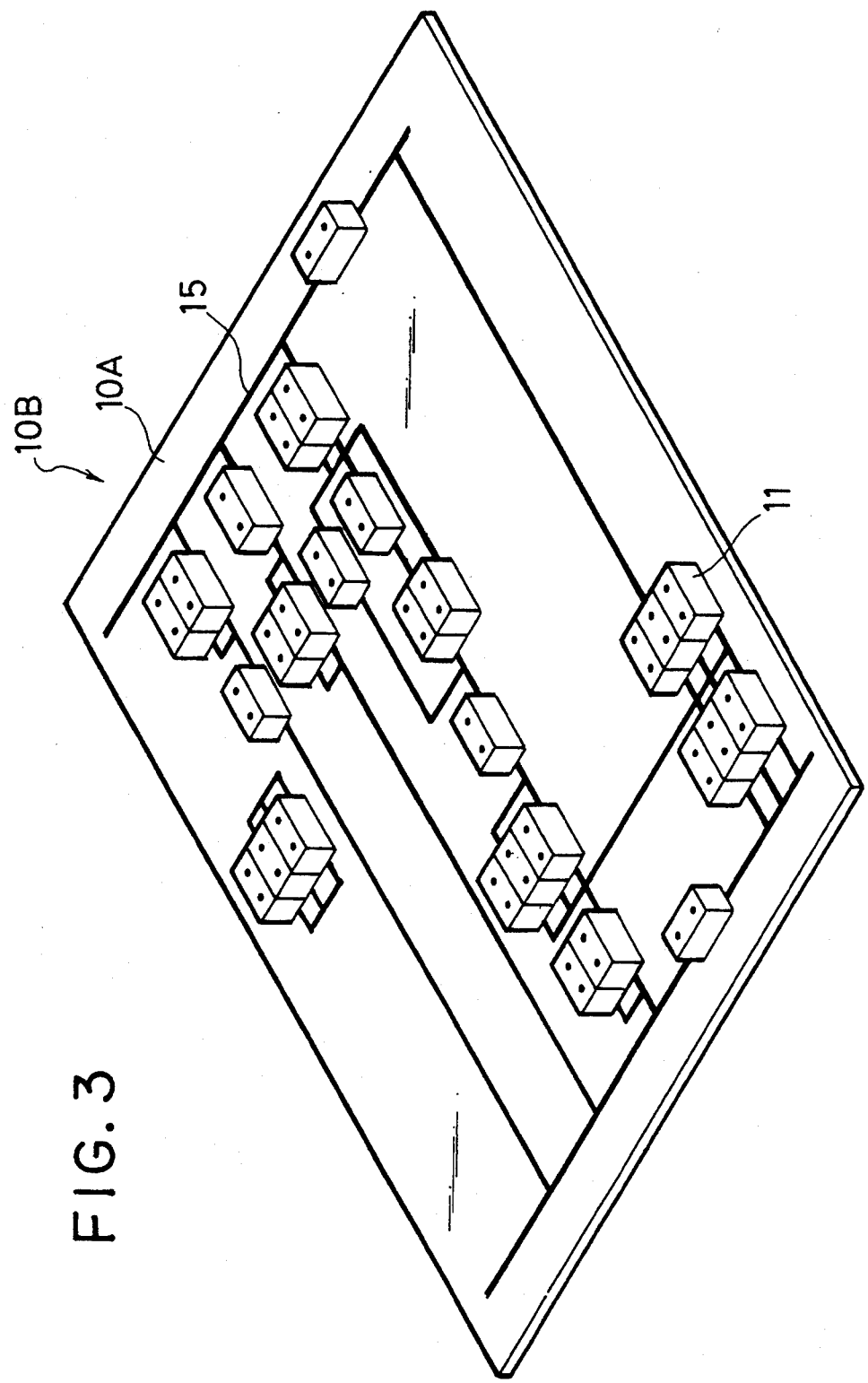
FIG. 3 is a perspective view showing the wiring board device of FIG. 2.

The wiring board assembly 10 is formed from a wiring board 10B. Details of an example of wiring board device 10B is shown in FIG. 2 and FIG. 3. In the example shown in FIG. 2 and FIG. 3, the printed wiring is patterned to form a schematic circuit diagram (developed diagram), and a plurality of two-point board connectors 11-01 to 11-72 of a normally-open type are provided on the board 10A, and connected to the printed wiring 15 on the board 10A. The wiring board device 10B with such wiring and board connectors can be used for forming any of various designs of circuits which may be desired in respective applications. For this purpose, the board connectors 11-01 to 11-72 are provided to permit selective connection of a short-circuiting connector 16 or a component connector 12 for connection to a functional component, which may be any one of the circuit breaker 2, the current transformer 3, the zero-phase transformer 4, the electromagnetic switch 5, the overcurrent relay 6, the auxiliary relays 7 and 8, and external switches (connected via the terminal block 9), as well as a push-button switch, a selection switch (control switch) and an indicator lamp. The individual board connectors are given reference marks "11-01" to "11-72", as illustrated, but a reference mark "11" may also be used to designate all or any one of the board connectors. The connection of the short-circuiting connector 16 or the component connector 12 with the board connector 11 can be achieved by simply inserting the former in the latter, e.g., by simply pushing or plugging the latter into the former.

Figure 4:
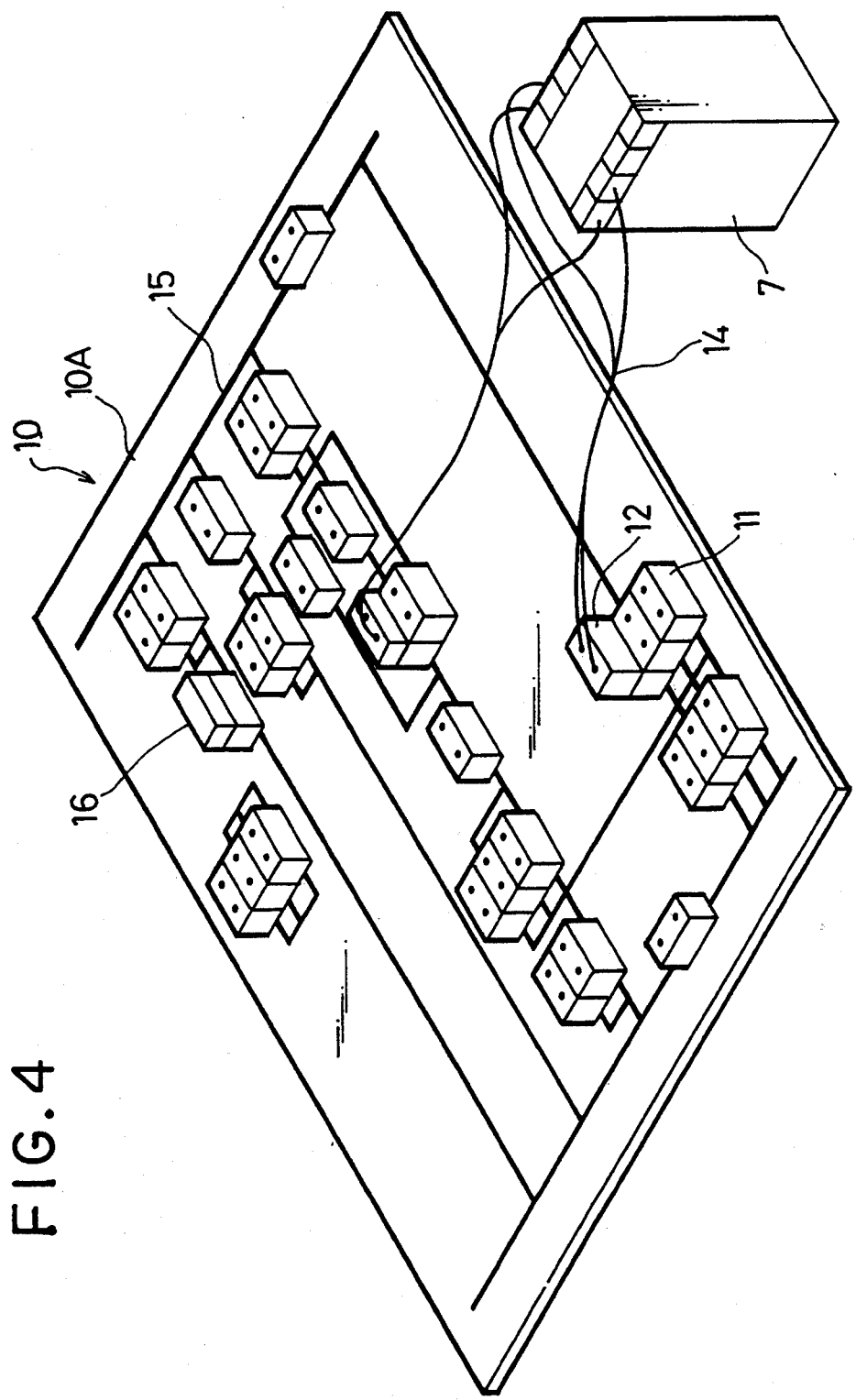
FIG. 4 is a perspective view showing the wiring board device of FIG. 2, with one magnetic relay and one short-circuit connector being added to illustrate the connection of the board connectors with functional components or short-circuiting connectors.

The component connector 12 is connected via flexible control circuit wires 14 to a functional component. When the functional component is a relay or an electromagnetic switch, the component connector 12 is connected to its excitation coil or to its contacts. In FIG. 4, a contact of an auxiliary relay 7 is shown to be connected to one of the board connectors 11 via a component connector 12 and wires 14, and another board connector 11 is shown to be short-circuited by a short-circuiting connector 16.

In FIG. 3 and FIG. 4, part only of the printed wiring 15 and the board connectors 11 that are shown in FIG. 2 are depicted for the sake of simplicity of illustration.

The selective connection to functional components or the selective short-circuiting is made depending on the particular design or type of unit circuit. In determining the configuration of the circuit of the wiring board device 10B, consideration is given to enable use of the wiring board device for formation of as many designs of final circuits as possible while at the same preventing the configuration of the wiring board device from becoming too complex.

The length of the wires 14 is so determined as to be sufficient for connection of the board connectors 11 on the board 10A with the functional components at the most distant location within the unit housing 1. Here the distance is measured along the path which the wire runs for the interconnection.

The combination of the unit housing 1, the functional components and the wiring board device 10B is called a unit circuit intermediate assembly which can be used for formation of any one of a plurality of designs or types of unit circuits.

Figure 5:
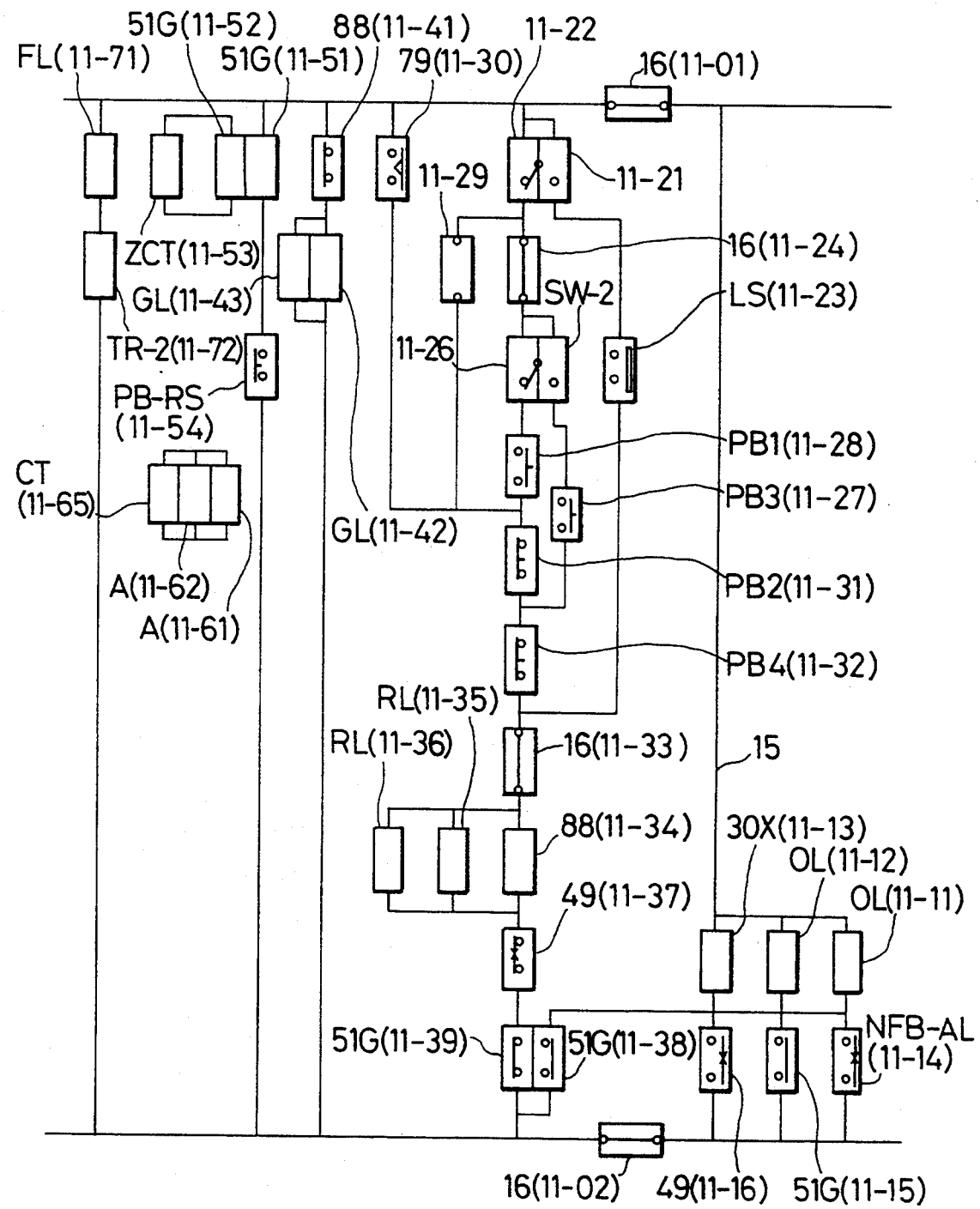
FIG. 5 is a layout diagram showing a circuit which would be obtained if short-circuiting connectors and functional components were connected to the board connectors in a manner described later.

FIG. 5 shows a circuit which would be obtained if, using the printed wiring board device 10B of FIG. 2 and FIG. 3, short-circuiting connectors 16 are connected to the board connectors 11-01 and 11-02, and functional components rather than short-circuiting connectors, are connected to all other board connectors 11-11 to 11-72, in the manner specifically described below. In FIG. 5, the reference marks of the board connectors (which are covered by a component connector 12 or a short-circuiting connector 16) are indicated in parentheses).

Short-circuiting connectors 16 are connected to the board connector 11-01 and 11-02.

Orange lamps OL are connected to the board connectors 11-11 and 11-12.

A coil of a relay 30X is connected to the board connector 11-13.

A normally-open contact NFB-AL of a no-fuse breaker NFB is connected to the board connector 11-14.

A normally-open contact of a ground relay 51G is connected to the board connector 11-15.

A normally-open circuit breaker contact of a relay 49 (whose coil is not shown but is excited when the relay 30X is excited) is connected to the board connector 11-16.

A selection switch (provided on the unit housing) SW-1 is connected to the board connectors 11-21 and 11-22.

A limit switch LS (provided outside the unit housing 1) is connected via the terminal block 9 to the board connector 11-23.

An external switch (provided outside the unit housing 1) is connected via the terminal block 9 to the board connector 11-24.

A selection switch (provided on the unit housing) SW-2 is connected to the board connectors 11-25 and 11-26.

An external normally-open push-button switch PB3 (provided outside the unit housing 1) is connected via the terminal block 9 to the board connector 11-27.

A normally-open push-button switch PB1 (provided on the unit housing 1, typically on a front panel, not illustrated, of the unit housing 1) is connected to the board connector 11-28.

A normally-open contact of an auxiliary relay 88 is connected to the board connector 11-29.

A timer contact of a time-delay under-voltage protection relay 79 is connected to the board connector 11-30.

A normally-closed push-button switch PB2 is connected to the board connector 11-31.

An external normally-closed push-button switch PB4 (provided outside the unit housing 1) is connected via the terminal block 9 to the board connector 11-32.

Another external switch (provided outside the unit housing 1) is connected via the terminal block 9 to the board connector 11-33.

A coil of the relay 88 is connected to the board connector 11-34.

Red lamps RL are connected to the board connectors 11-35 and 11-36.

A normally-closed circuit breaker contact of the relay 49 is connected to the board connector 11-37.

A normally-open contact of the relay 51G is connected to the board connector 11-38.

A normally-closed contact of the relay 51G is connected to the board connector 11-39.

A normally-closed contact of the relay 88 is connected to the board connector 11-41.

Green lamps GL are connected the board connectors 11-42 and 11-43.

An output of the relay 51G is connected to the board connector 11-51.

An input of the relay 51G is connected to the board connector 11-52.

A zero-phase current transformer ZCT is connected to the board connector 11-53.

A resetting push-button switch PB-RS is connected to the board connector 11-54.

Ampere meters A are connected to the board connectors 11-61 and 11-62.

A secondary winding of a current transformer CT is connected to the board connector 11-63.

A fuse FL is connected to the board connector 11-71.

A secondary winding TR-2 of a transformer TR is connected to the board connector 11-72.

It should be noted that the functional components are not disposed on the board 10A. Some of them are disposed in or on (e.g., on the front panel of) the unit housing but outside the board 10A and are connected by wires 14 to the board connectors 12. Some of them are disposed outside or remote from the unit housing and are connected via the terminal block 9.

Figure 6:
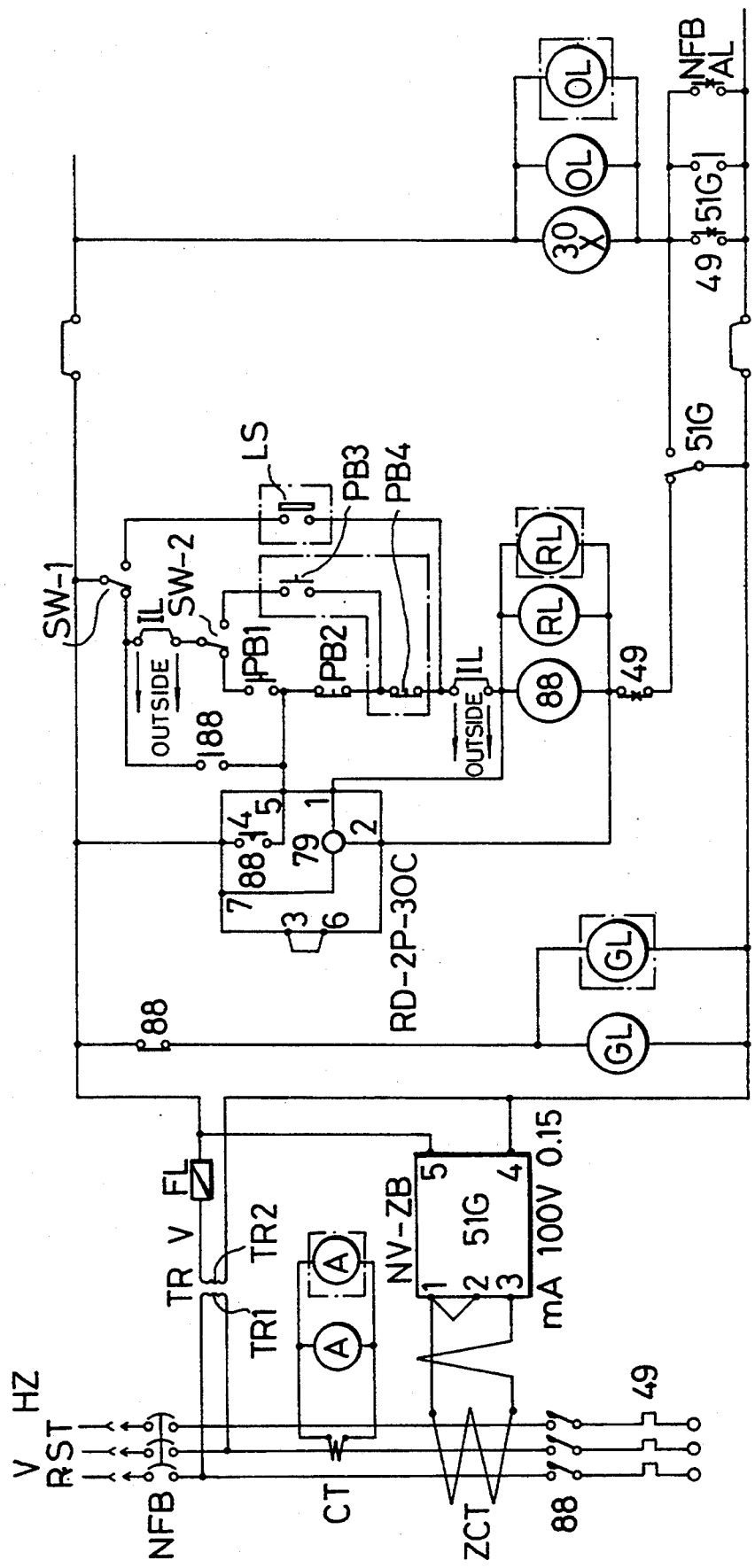
FIG. 6 is a circuit diagram showing the circuit of FIG. 5.

FIG. 6 shows, in a different representation, the circuit of FIG. 5. FIG. 6 also shows the main circuit and connection of the power supply lines of the control circuit to the main circuit.

The manner of forming different final circuits by selective connection of the board connectors will next be described with reference to FIG. 7A to FIG. 7E, FIG. 8A to FIG. 8E and FIG. 9A to FIG. 9E, which show a part of the circuit of FIG. 5 and FIG. 6. In FIG. 7A to FIG. 7E, a vertical line crossing the board connector 11 indicates that a short-circuiting connector 16 is connected to the board connector 11, and connection of the short-circuiting connector is also indicated by the reference mark "16", with a reference mark of the board connector connected thereto being also indicated in parentheses). Where a component is connected (via a component connector) to the board connector, connection of the component is indicated by the reference mark of the component, with a reference mark of the board connector connected thereto being also indicated in parentheses). The board connector to which nothing is connected and which is therefore open is indicated by its reference mark without the parentheses.

Figure 7A:
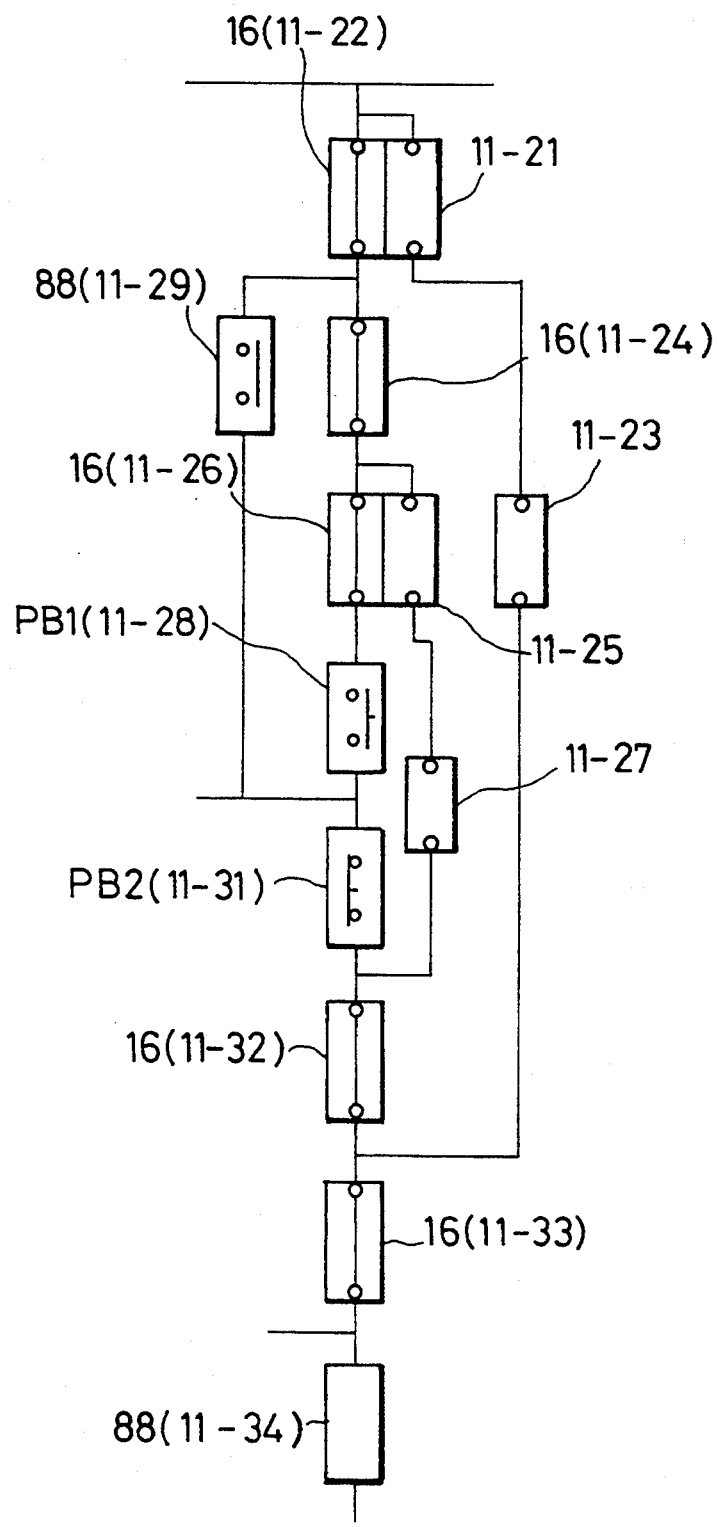
FIG. 7A to FIG. 7E are schematic diagrams showing connection of functional components and short-circuiting connectors to the board connectors, for formation of different designs of unit circuits.
Figure 8A:
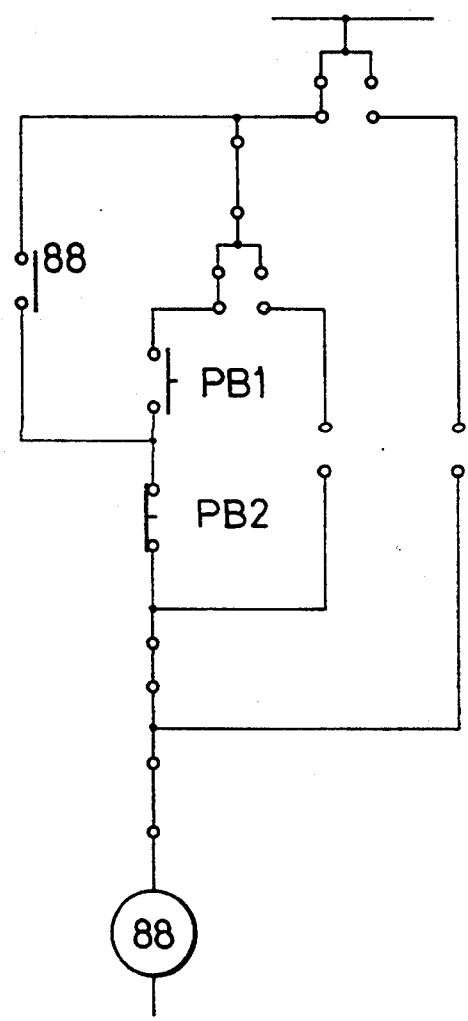
FIG. 8A to FIG. 8E are circuit diagrams showing the unit circuit formed by the selective connection of functional components and short-circuiting connectors to the board connectors in the manner shown in FIG. 7A to FIG. 7E.
Figure 9A:
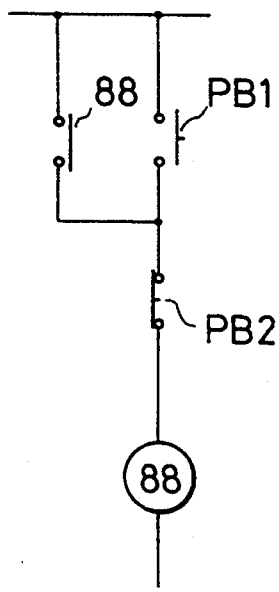
FIG. 9A to FIG. 9E are circuit diagrams equivalent to FIG. 8A to FIG. 8E and omitting illustration of connectors which are either short-circuited or left open.

The final circuit shown in FIG. 8A and FIG. 9A is obtained by connecting the functional components and short-circuiting connectors to the board connectors, and leaving some of the board connectors unconnected (connecting nothing to the board connectors) as illustrated in FIG. 7A. That is:

short-circuiting connectors 16 are connected to the board connectors 11-22, 11-24, 11-26, 11-32 and 11-33;

nothing is connected to the board connectors 11-21, 11-23, 11-25 and 11-27;

a normally-open push-button switch PB1 is connected to the board connector 11-28;

a normally-open contact of a relay 88 is connected to the board connector 11-29;

a normally-closed push-button switch PB2 is connected to the board connector 11-31; and a coil of the relay 88 is connected to the board connector 11-34.

With this circuit configuration, the relay 88 is controlled by manipulation of the switches PB1 and PB2 (provided on the unit housing 1, typically on the front panel, not illustrated, of the unit housing).

Figure 7B:
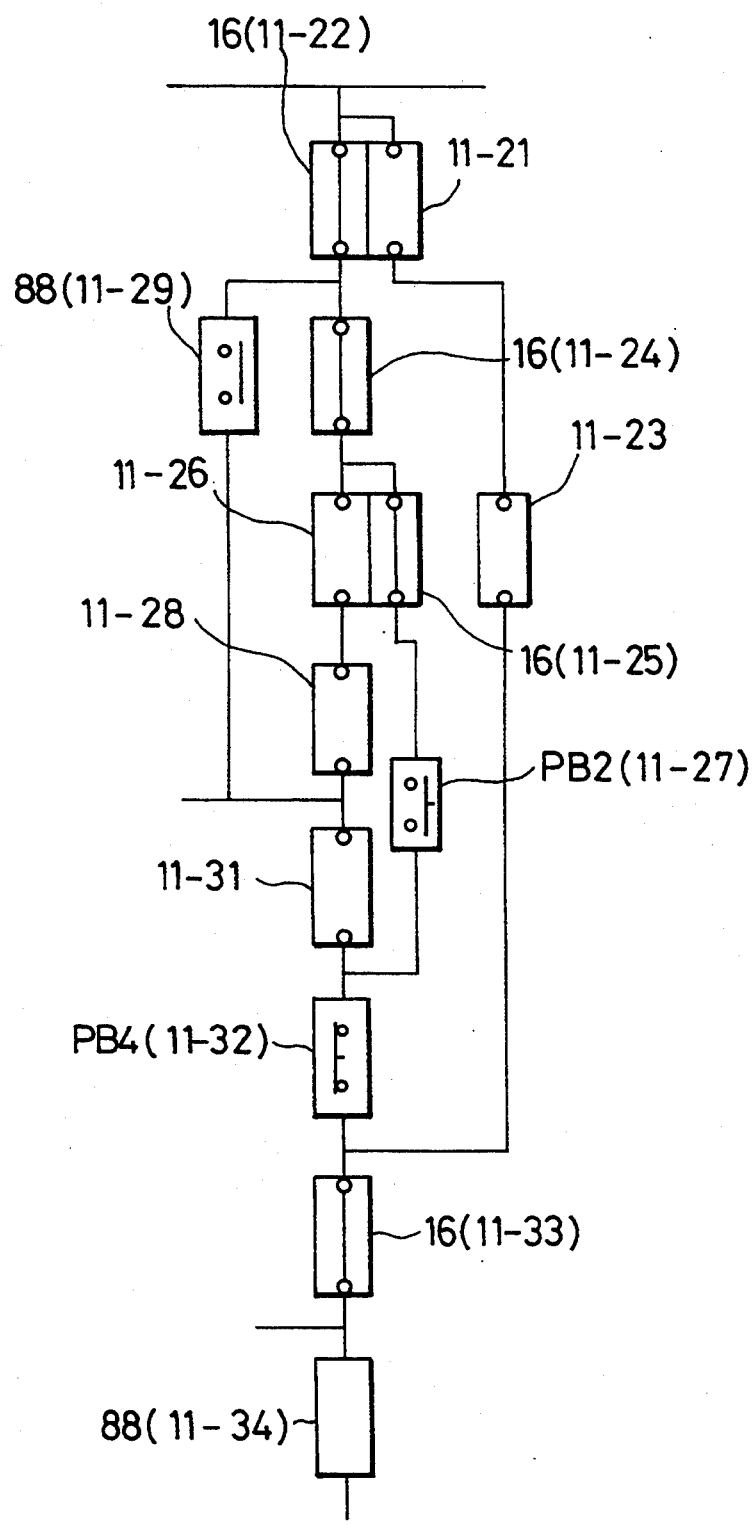
Figure 8B:
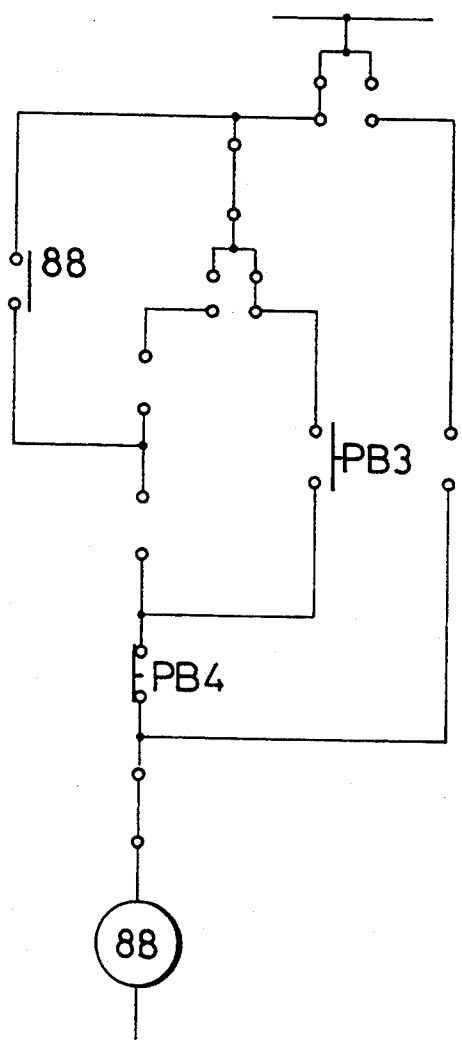
Figure 9B:
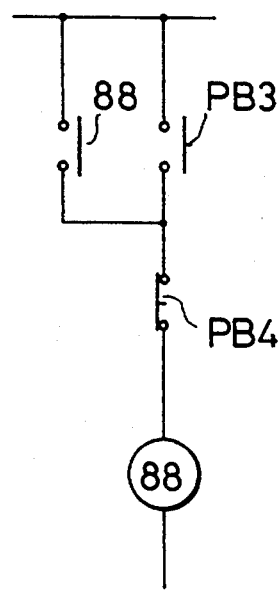

The final circuit shown in FIG. 8B and FIG. 9B is obtained by connecting the functional components and short-circuiting connectors to the board connectors, and leaving some of the board connectors unconnected as illustrated in FIG. 7B. That is:

short-circuiting connectors 16 are connected to the board connectors 11-22, 11-24, 11-25, 11-31 and 11-33;

nothing is connected to the board connectors 11-21, 11-23, 11-26 and 11-28;

a normally-open push-button switch PB3 is connected to the board connector 11-27;

a normally-open contact of a relay 88 is connected to the board connector 11-29;

a normally-closed push-button switch PB4 is connected to the board connector 11-32; and a coil of the relay 88 is connected to the board connector 11-34.

With this circuit configuration, the relay 88 is controlled by manipulation of remote switches PB3 and PB4 (provided remote from the unit housing 11).

Figure 7C:
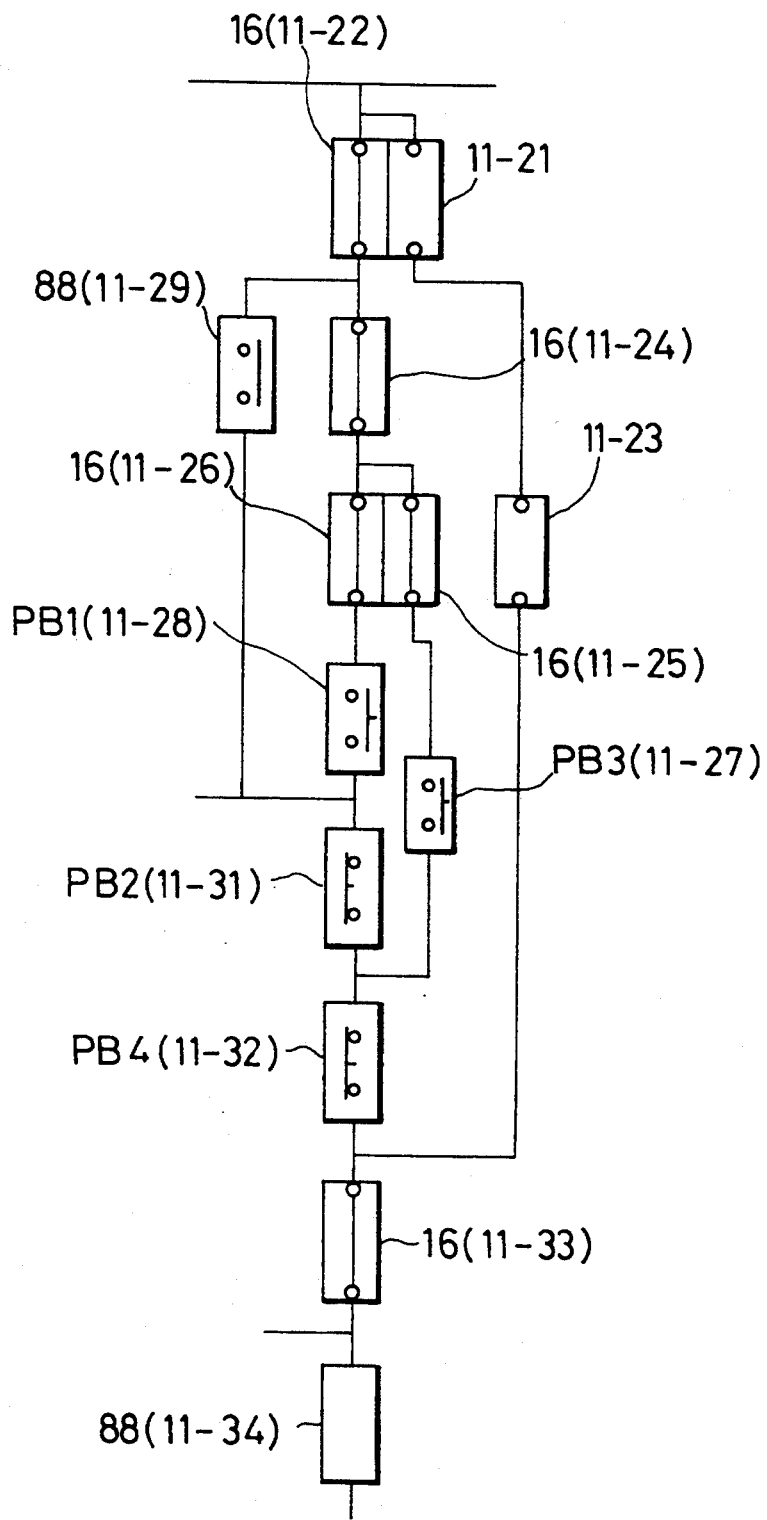
Figure 8C:
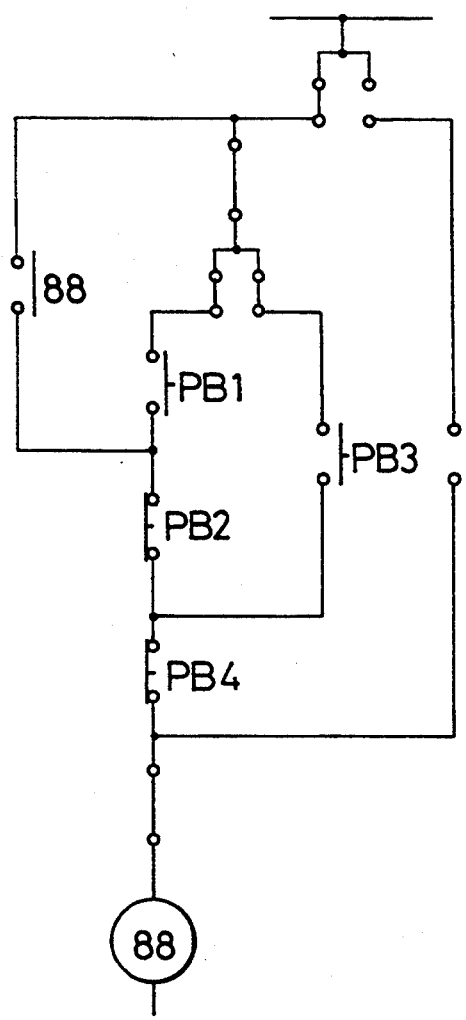
Figure 9C:
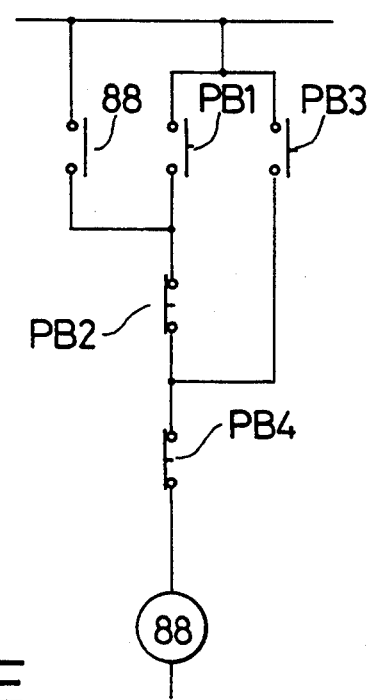

The final circuit shown in FIG. 8C and FIG. 9C is obtained by connecting the functional components and short-circuiting connectors to the board connectors, and leaving some of the board connectors unconnected as illustrated in FIG. 7C. That is:

short-circuiting connectors 16 are connected to the board connectors 11-22, 11-24, 11-25, 11-26 and 11-33;

nothing is connected to the board connectors 11-21 and 11-23;

normally-open push-button switches PB1 and PB3 are respectively connected to the board connectors 11-28 and 11-27;

a normally-open contact of a relay 88 is connected to the board connector 11-29;

normally-closed push-button switches PB2 and PB4 are respectively connected to the board connectors 11-31 and 11-32; and a coil of the relay 88 is connected to the board connector 11-34.

With this circuit configuration, the relay 88 is controlled by manipulation of any of the switches PB1 to PB4.

Figure 7D:
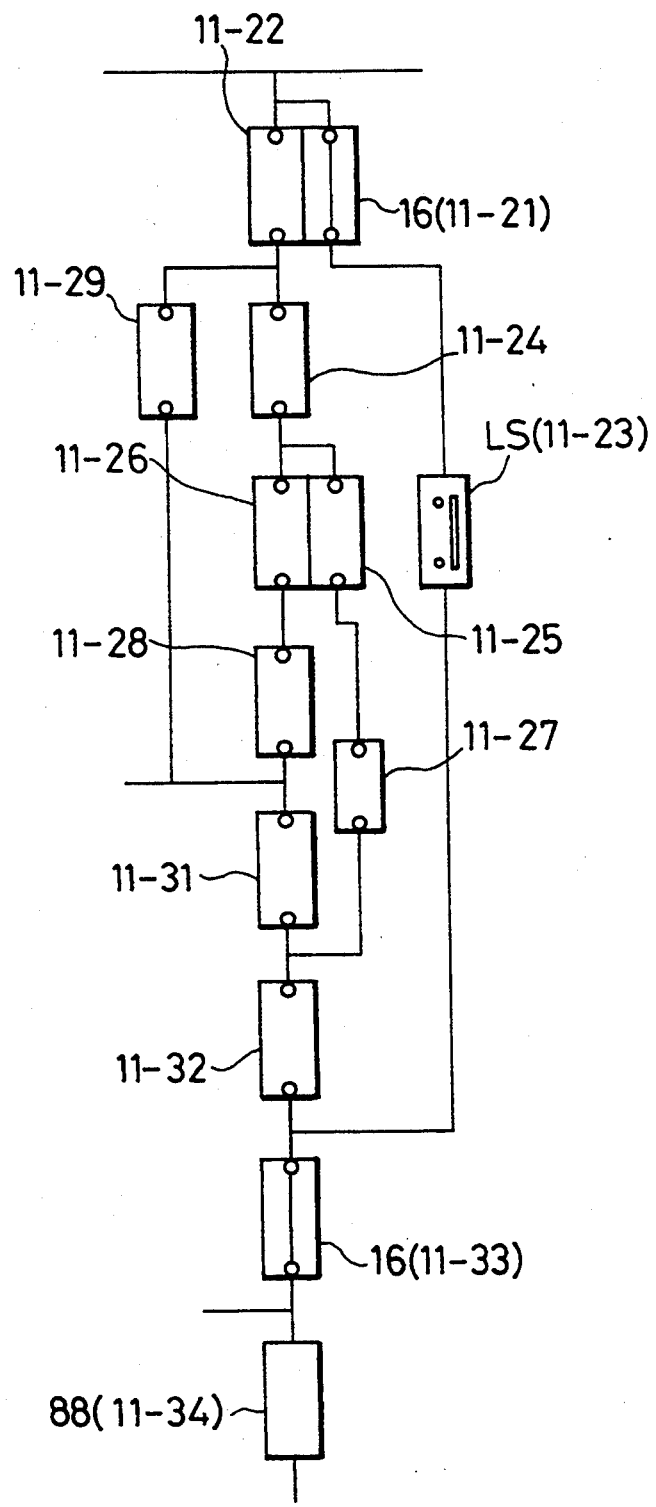
Figure 8D:
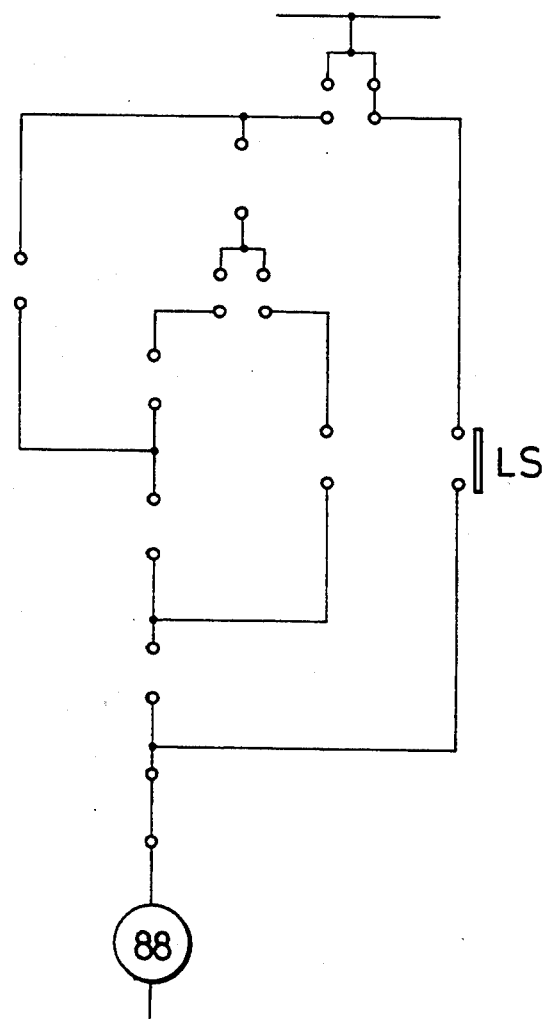
Figure 9D:
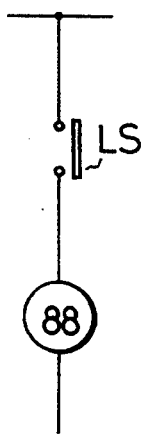

The final circuit shown in FIG. 8D and FIG. 9D is obtained by connecting the functional components and short-circuiting connectors to the board connectors, and leaving some of the board connectors unconnected as illustrated in FIG. 7D. That is:

short-circuiting connectors 16 are connected to the board connectors 11-21 and 11-33;

nothing is connected to the board connectors 11-22, 11-24, 11-25, 11-26, 11-27, 11-28, 11-29, 11-31 and 11-32;

a limit switch LS is connected to the board connector 11-23; and a coil of the relay 88 is connected to the board connector 11-34.

With this circuit configuration, the relay 88 is controlled by the limit switch LS.

Figure 7E:
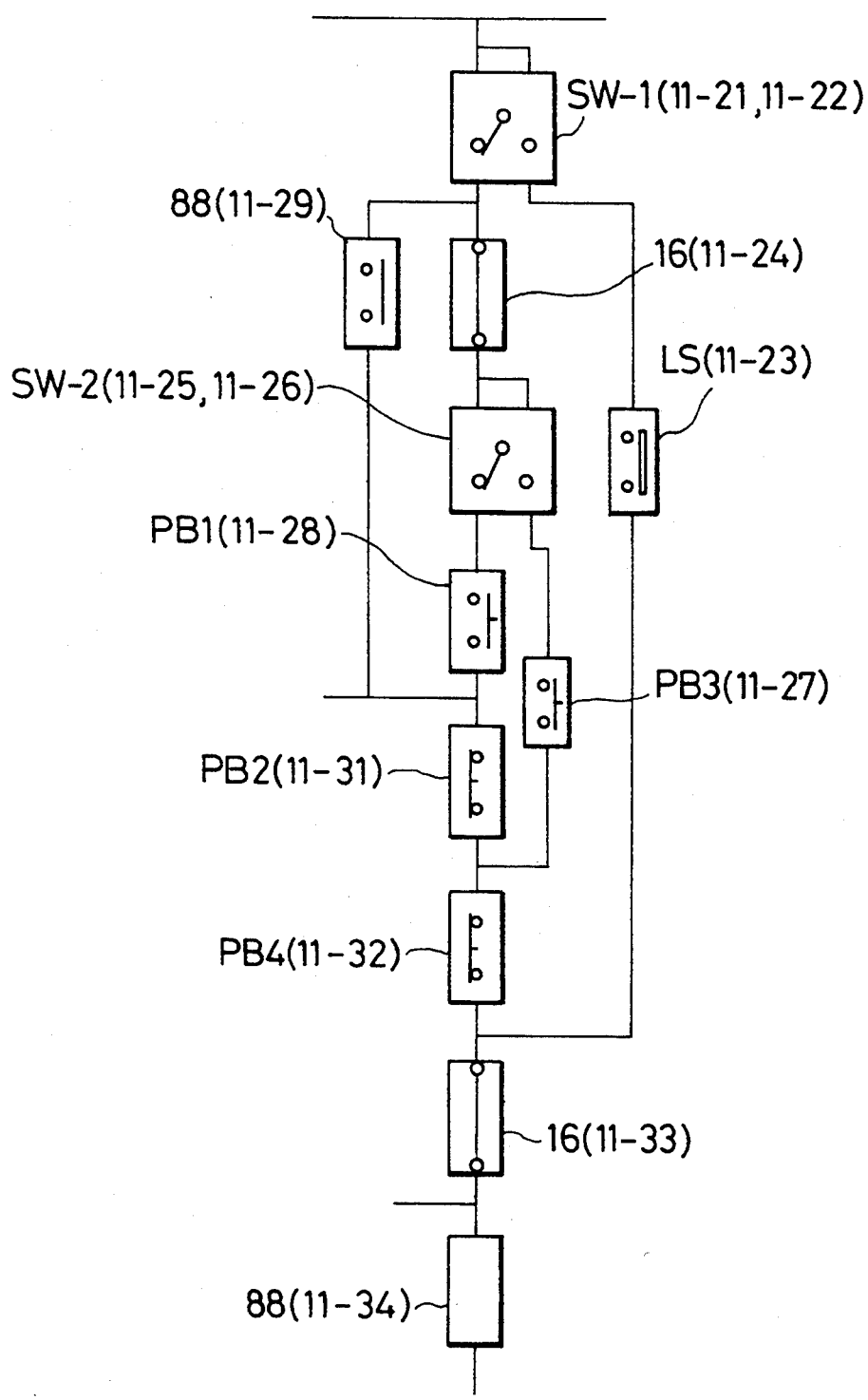
Figure 8E:
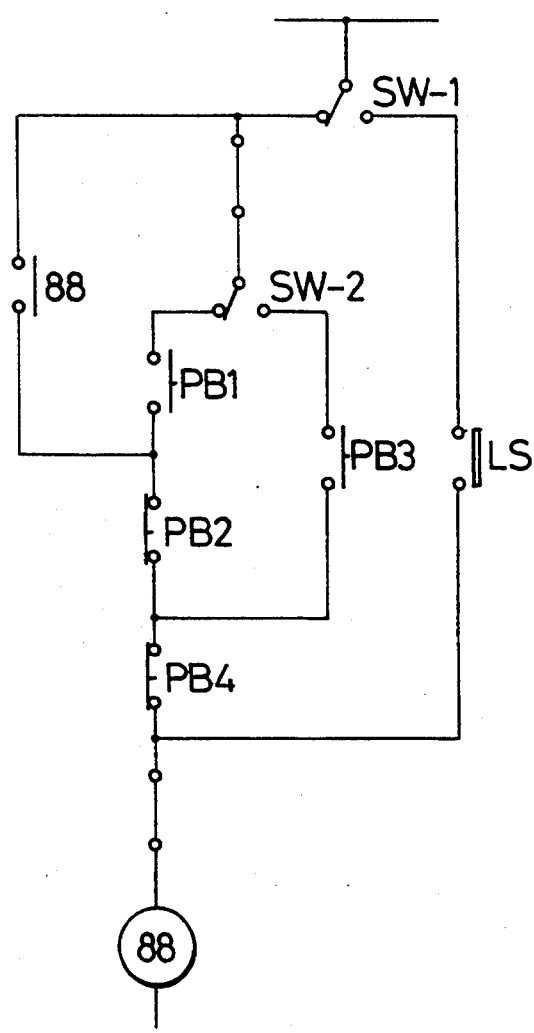
Figure 9E:
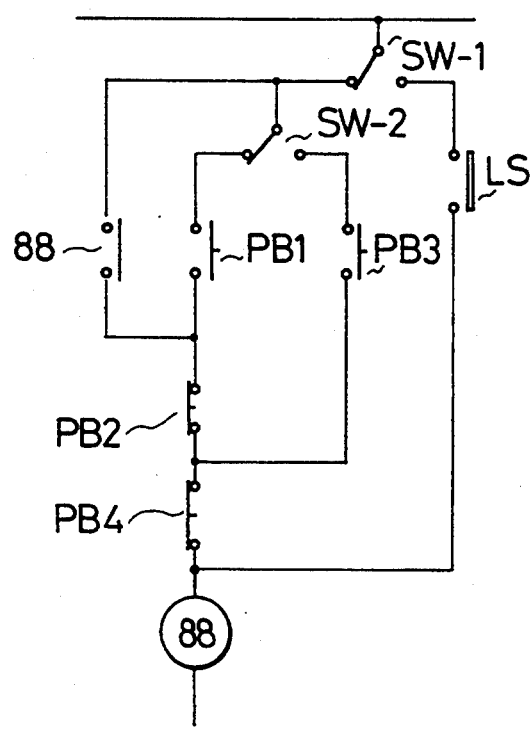

The final circuit shown in FIG. 8E and FIG. 9E is obtained by connecting the functional components and short-circuiting connectors to the board connectors as illustrated in FIG. 7E. That is:

short-circuiting connectors 16 are connected to the board connectors 11-24 and 11-33;

a control switch SW-1 is connected to the board connector 11-21 and 11-22;

another control switch SW-2 is connected to the board connector 11-25 and 11-26;

normally-open push-button switches PB1 and PB3 are respectively connected to the board connectors 11-28 and 11-27;

a normally-open contact of a relay 88 is connected to the board connector 11-29;

normally-closed push-button switches PB2 and PB4 are respectively connected to the board connectors 11-31 and 11-32; and a coil of the relay 88 is connected to the board connector 11-34.

With this circuit configuration, the relay 88 is controlled by selected ones of the switches PB1 to PB4 and the limit switch LS. The selection is made by manipulation of the selection switches SW-1 and SW-2. When the selection switch SW-1 is in the state illustrated, i.e., it connects its contacts b and c as illustrated, the control of the relay 88 is made by manipulation of the switches PB1 to PB4. If the selection switch SW-2 is in the state as illustrated, i.e., it connects its contacts b and c as illustrated, excitation of the relay 88 is started by manipulation of the switch PB1. If the selection switch is in a state opposite to that illustrated, i.e., it connects its contacts a and c, excitation of the relay 88 is started by manipulation of the switch PB3. The excitation of the relay 88 can be terminated by manipulation of either of the switches PB2 and PB4. Where the selection switch SW-1 is in the state opposite to that illustrated, i.e., it connects its contact a and c, the excitation of the relay 88 is started the limit switch LS is closed and is terminated when the limit switch LS is opened.

It will thus be understood that by selective connection of the board connectors different designs of final circuits can be produced.

As mentioned above, according to the invention, the final unit circuit is formed using a wiring board device 10B which is an intermediate product having the wiring 15, e.g., a printed wiring, on the board 10A, and the board connectors 11 connected to the wiring 15 and provided to permit selective connection of functional components to selectively form any one of a plurality of designs of unit circuits.

For forming the final unit circuit according to the invention, the functional components and the wiring board device 10B are disposed in or on a unit housing 1, and the board connectors 11 are selectively connected to the functional components to selectively form a desired one of the plurality of designs of unit circuits.

Preferably, one end of each wire for connection with a functional component is processed for connection and connected to the functional component prior to the disposition or mounting of the functional component in the unit housing 1. This will further facilitate the work of wiring and eliminates the need of a space around the functional component for the work of wiring.

In the illustrated embodiment, the other end of each wire is provided with a component connector 12 for connection with the board connector 11. The board connector 11 and the component connector 12 are of such a type that by simply pushing or plugging the component connector 12 into the board connector 11, the component connector 12 and the board connector 11 are electrically connected with each other. This configuration will further facilitate the work of wiring.

The short-circuiting connector 16 is structured similarly. That is, the short-circuit connector 16 can be inserted into board connector 11 by simply pushing or plugging the short-circuiting connector 16 into the board connector 11 to achieve the desired short-circuiting.

Figure 10A:
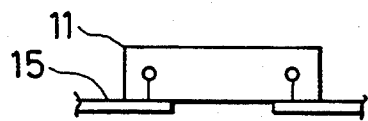
FIG. 10A to FIG. 10C are schematic diagrams showing a board connector, a short-circuiting connector and a component connector which are used in the embodiment.
Figure 11A:
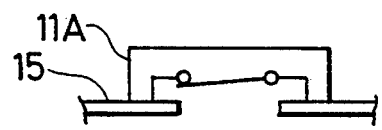
FIG. 11A to FIG. 11C are schematic diagrams showing a board connector, an opening connector and a component connector which may be used in place of the connectors of FIG. 10A to FIG. 10C.
Figure 10B:
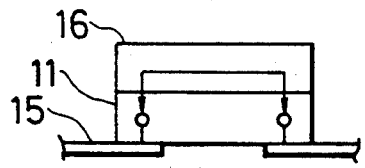
Figure 11B:
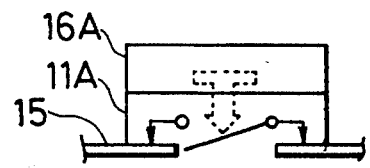
Figure 10C:
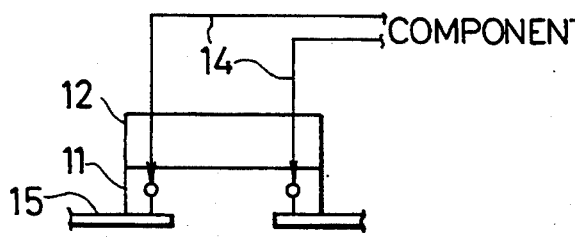
Figure 11C:
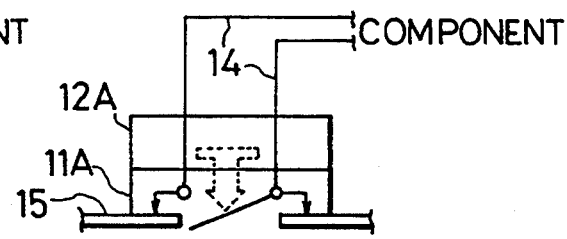
Figure 12:
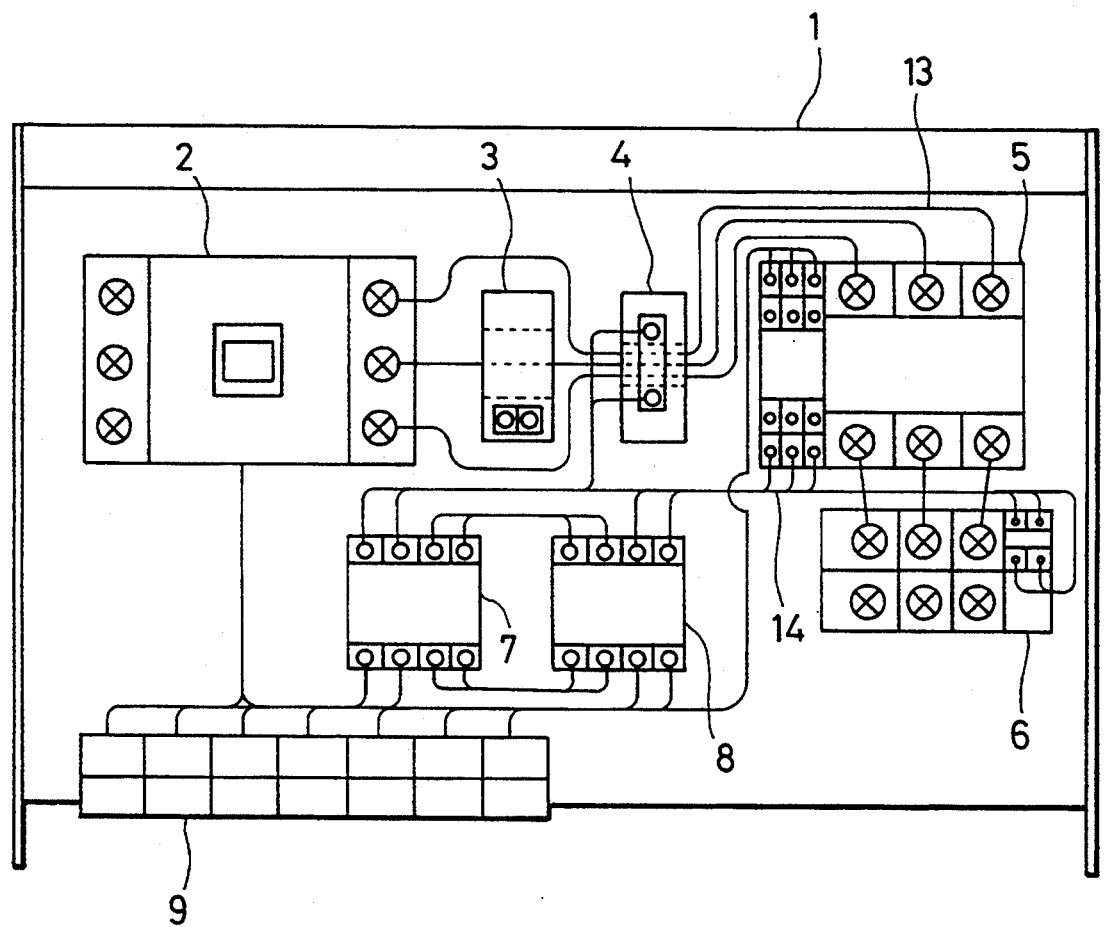
Figure 13:
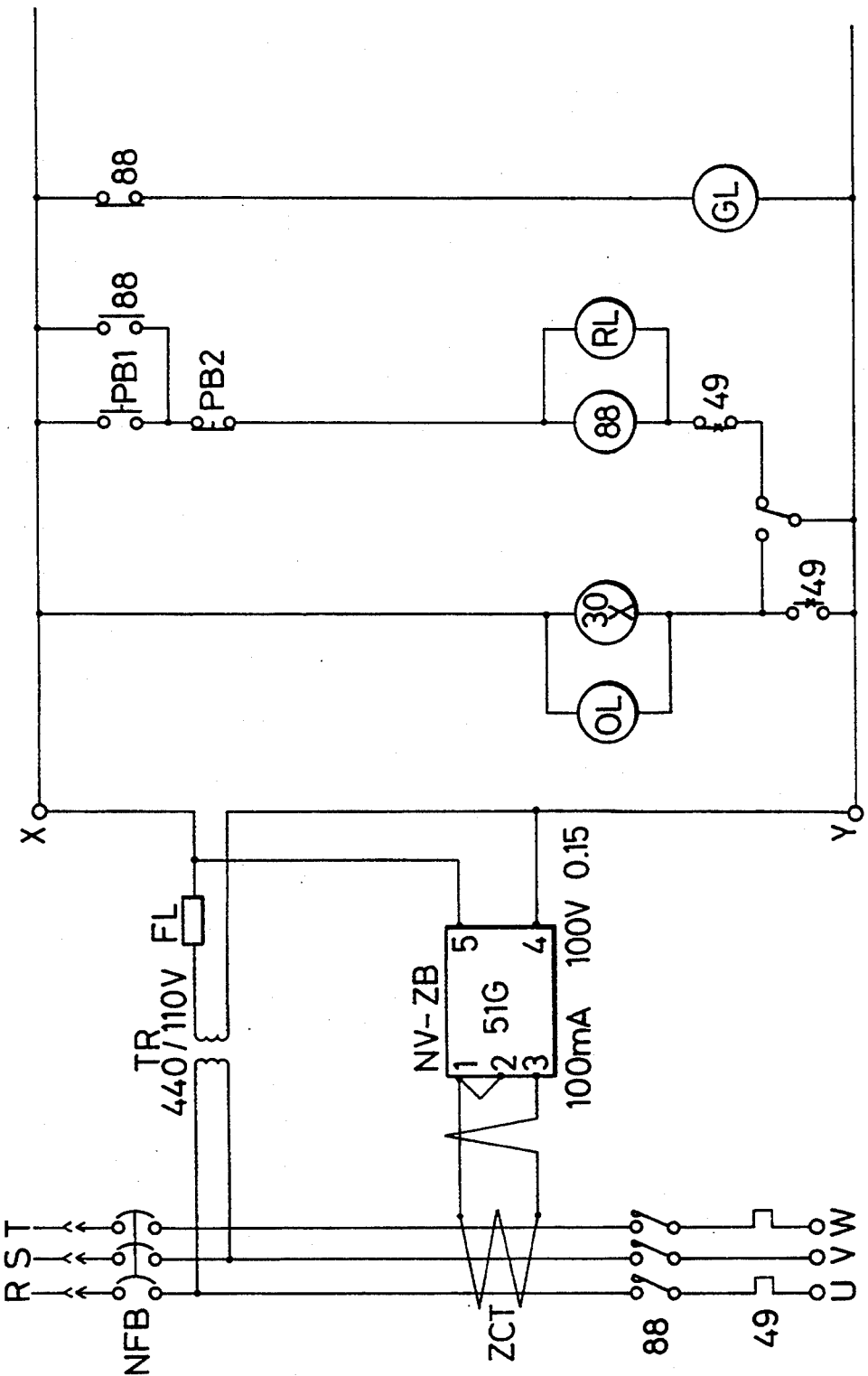
FIG. 13 is a circuit diagram showing electrical connection of a design of conventional unit circuits.

In the embodiment described, the board connectors 11 are of a normally-open type which is open (FIG. 10A) when nothing is connected, and is short-circuited by a short-circuiting connector 16 (FIG. 10B) or is connected with a component connector 12 (FIG. 10C) which in turn is connected to a functional component. Alternatively, one may use board connectors 11A of a normally-closed type (FIG. 11A) which are closed when nothing is connected. In such a case, no short-circuiting connectors are required where the board connector is to be short-circuited. Where the board connector 11A is to be opened, an opening connector 16A (FIG. 11B) which opens the board connector 11A when it is inserted or plugged in the board connector 11A is used. If the board connector 11A is to be connected to a functional component, a component connector 12A (FIG. 11C) is inserted in the board connector 11A to connect the terminal of the board connector to the terminals of the component connector and at the same time blocks the direct connection between the terminals of the board connector 11A.

In the embodiment described two-point connectors are used. But any other types of connectors can be used in place.

In the embodiment described, printed wiring is formed on the board, but wiring other than printed wiring may also be used.

Advantages

As has been described according to the invention, a wiring board device which is an intermediate product is prepared and used for formation of any of various designs of final unit circuits that may be desired in various applications. The formation of the final unit circuit is accomplished by selective connection of the functional components and short-circuiting connectors or opening connectors to board connectors of the wiring board device. The connection is readily achieved by simply inserting, e.g., by pushing or plugging the component connectors, short circuiting connectors or opening connectors into the board connectors. The functional components as referred to here include a coil of a relay, a contact of a relay, a lamp, a push-button switch and a selection switch. Thus, a common wiring board device can be used for forming any of various designs of unit circuits. Moreover, the work of the wiring is easy. The invention exhibits a particular advantage where the functional components that are connected are mostly identical but their connection within the unit circuit is different.

The invented wiring board device also facilitates remodeling, replacement and repair of the circuit.

By forming the wiring of a printed wiring having a pattern of a developed schematic diagram of a sequential unit circuit, the work of wiring is further facilitated and is more efficient.

By connecting one end of the wire to the functional component prior to mounting the functional component in the unit housing, (and since the other end of the wire is connected to a component connector which can be connected to the board connector by simply pushing or plugging for example) no space for the work of wiring is needed in the unit housing (around the functional component) so that the size of the unit circuit can be reduced.

What is claimed is:

1. A unit circuit intermediate assembly used for forming a desired one of a plurality of design of switchboard unit circuits, comprising:
   a unit housing;
   functional components of the unit circuits; and
   a wiring board device;
   wherein at least some of said functional components and said wiring board are disposed in said unit housing; and
   wherein said wiring board device comprises;
   a board;
   a wiring formed on the board;
   board connectors connected to the wiring and for permitting selective connection of said functional components to form said plurality of designs of unit circuits; and
   component connectors for removably connecting to said board connectors and for selectively connecting different parts of a desired functional component to different respective board connectors to form said plurality of designs of unit circuits.

2. The assembly of claim 1, wherein the board connectors are of a normally-open type to permit selective connection of a short-circuiting connector to the board connector which is to be short-circuited.

3. The assembly of claim 1, wherein the board connectors are of a normally-closed type to permit selective connection of an opening connector to the board connector which is to be opened.

4. The assembly of claim 1, wherein said functional components include at least one of a circuit breaker, an electromagnetic switch, an auxiliary relay, a push-button switch, and a selection switch.

5. The assembly of claim 1, further comprising wires each having one end connected to the functional component and having the other end connected to a component connector that can be connected to the board connectors.

6. The assembly of claim 1, further comprising terminals provided in the unit housing for connection with additional functional components provided outside the unit housing, said board connectors also permitting selective connection of said additional functional components to form said plurality of designs of unit circuits.

7. The assembly of claim 1, wherein at least some of said functional components and said wiring board device are disposed on said unit housing.

8. The assembly of claim 1, further comprising flexible wiring for removably connecting the functional components and the component connectors.

9. A wiring board device for forming a desired one of a plurality of design of switchboard unit circuits having functional components, comprising:
   a board;
   wiring on the board;
   board connectors connected to the wiring and for permitting selective connection of said functional components to form said plurality of designs of unit circuits; and
   component connectors for removably connecting to said board connectors and to the functional components to permit selective connection between different parts of desired ones of the functional components to different respective board connectors to form said plurality of designs of unit circuits.

10. The device of claim 9, wherein the board connectors are of a normally-open type to permit selective connection of a short-circuiting connector to the board connector which is to be short-circuited.

11. The device of claim 9, wherein the board connectors are of a normally-closed type to permit selective connection of an opening connector to the board connector which is to be opened.

12. The device of claim 9, wherein said functional components include at least one of a circuit breaker, an electromagnetic switch, an auxiliary relay, a push-button switch, and a selection switch.

13. The device of claim 9, wherein said wiring is a printed wiring.

14. The device of claim 9, further comprising flexible wiring for removably connecting the functional components and the component connectors.

15. A method of forming a desired one of a plurality of design of switchboard unit circuits having functional components, comprising the steps of:
   disposing at least some functional components in a unit housing;
   providing a wiring board device including a board, a wiring on the board, and board connectors connected to the wiring and for permitting selective connection of the functional components to selectively form a plurality of designs of unit circuits;
   disposing the wiring board device in the unit housing;

removably connecting the functional component to the board connectors to selectively form a desired one of said plurality of designs of unit circuits; and removably connecting between different parts of a desired ones of the functional components to different respective board connectors by at least one component connector to form said plurality of designs of unit circuits.

16. The method of claim 15, wherein the board connectors are of a normally-open type, and said method further comprises:

selectively connecting short-circuiting connectors to the board connectors which are to be short-circuited.

17. The method of claim 15, wherein the board connectors are of a normally-closed type, and said method further comprises:

selectively connecting opening connectors to the board connectors which are to be opened.

18. The method of claim 15, wherein said functional components include at least one of a circuit breaker, an electromagnetic switch, an auxiliary relay, a push-button switch, and a selection switch.

19. The method of claim 15, further comprising the steps of:

providing terminals in the unit housing; and selectively connecting additional functional components provided outside the unit housing, via the terminals to the board connectors.

20. The method of claim 15, further comprising the steps of:

providing a unit circuit intermediate assembly comprising a unit housing, disposing at least some of said functional components and wiring board device in said unit housing;

connecting a first end of a wire to at least one of said functional components prior to mounting of at least one of said functional components in said housing.

21. The method of claim 20, further comprising the steps of:

providing a component connector to a second end of each wire connected to the at least one of said functional components and;

connecting the component connector to the board connector.

22. The method of claim 20, wherein at least some of said functional components and said wiring board device are disposed on said unit housing.

23. The method of claim 15, wherein at least some of said functional components and said wiring board device are disposed on said unit housing.

* * * * *